US006633437B1

(12) United States Patent
Hoshi et al.

(10) Patent No.: US 6,633,437 B1
(45) Date of Patent: Oct. 14, 2003

(54) ZOOM LENS AND PHOTOGRAPHING APPARATUS HAVING IT

(75) Inventors: Koji Hoshi, Yokohama (JP); Makoto Sekita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,849

(22) Filed: Jul. 26, 2000

(30) Foreign Application Priority Data

Jul. 28, 1999 (JP) .......................... 11-213369
Dec. 28, 1999 (JP) .......................... 11-372461

(51) Int. Cl.⁷ .............................................. G02B 15/14
(52) U.S. Cl. ........................................ 359/687; 359/685
(58) Field of Search ............................. 359/687, 685, 359/683, 676

(56) References Cited

U.S. PATENT DOCUMENTS

| 4,299,452 | A | | 11/1981 | Ikemori .................... 359/681 |
| 4,370,031 | A | | 1/1983 | Ikemori .................... 359/681 |
| 4,657,351 | A | * | 4/1987 | Mori ........................ 359/687 |
| 4,991,942 | A | | 2/1991 | Fujibayashi et al. ...... 359/690 |
| 5,103,343 | A | | 4/1992 | Sekita ...................... 359/684 |
| 5,132,848 | A | | 7/1992 | Nishio et al. ............. 359/686 |
| 5,168,402 | A | * | 12/1992 | Mihara ..................... 359/684 |
| 5,179,472 | A | * | 1/1993 | Ohno et al. ............... 359/687 |
| 5,253,113 | A | | 10/1993 | Sekita et al. ............. 359/680 |
| 5,283,639 | A | | 2/1994 | Esch et al. .................. 348/6 |
| 5,434,710 | A | | 7/1995 | Zozawa ..................... 359/689 |
| 5,570,233 | A | | 10/1996 | Mihara et al. ............. 359/687 |
| 5,572,364 | A | | 11/1996 | Toide et al. ............... 359/649 |
| 5,574,599 | A | | 11/1996 | Hoshi et al. .............. 359/689 |
| 5,682,269 | A | | 10/1997 | Kimura et al. ............ 359/770 |
| 5,784,205 | A | * | 7/1998 | Nakayama et al. ....... 359/687 |
| 5,798,872 | A | * | 8/1998 | Uzawa ....................... 359/686 |
| 5,815,320 | A | | 9/1998 | Hoshi et al. ............. 359/686 |
| 5,831,772 | A | | 11/1998 | Nishio et al. ............. 359/689 |
| 5,872,658 | A | * | 2/1999 | Ori ........................... 359/677 |
| 5,917,662 | A | | 6/1999 | Sekita ...................... 359/729 |
| 5,923,478 | A | * | 7/1999 | Hashimura ............... 359/686 |
| 5,963,378 | A | | 10/1999 | Tochigi et al. ........... 359/687 |
| 5,973,858 | A | | 10/1999 | Sekita ...................... 359/729 |
| 5,995,287 | A | | 11/1999 | Sekita ...................... 359/599 |
| 6,016,228 | A | | 1/2000 | Uzawa ...................... 359/687 |
| 6,021,004 | A | | 2/2000 | Sekita et al. ............. 359/676 |
| 6,052,225 | A | | 4/2000 | Hoshi ....................... 359/432 |
| 6,124,972 | A | * | 9/2000 | Hayakawa et al. ....... 359/557 |
| 6,191,895 | B1 | * | 2/2001 | Arimoto et al. .......... 359/686 |
| 6,473,231 | B2 | * | 10/2002 | Hamano et al. .......... 359/557 |

FOREIGN PATENT DOCUMENTS

| JP | 53-132360 | | 11/1978 |
| JP | 56-19022 | | 2/1981 |
| JP | 5-72472 | | 3/1993 |
| JP | 6-27377 | | 2/1994 |
| JP | 7-52256 | | 2/1995 |
| JP | 7-52256 | B2 | 6/1995 |
| JP | 7-270684 | | 10/1995 |
| JP | 10-62687 | | 3/1998 |

\* cited by examiner

*Primary Examiner*—Jordan M. Schwartz
(74) *Attorney, Agent, or Firm*—Fitzpatrick, Cella, Harper & Scinto

(57) ABSTRACT

A zoom lens has the following lens components in the order named from the object side: a front lens component of a negative optical power, which has a first lens unit of a positive optical power and a second lens unit of a negative optical power in the order named from the object side; and a rear lens component of a positive optical power, which has a third lens unit of a positive optical power and a fourth lens unit of a positive optical power in the order named from the object side. The zoom lens varies a spacing between principal points of the front lens component and rear lens component by varying a spacing between the first lens unit and the second lens unit and a spacing between the third lens unit and the fourth lens unit, in order to effect zooming. The first lens unit and the fourth lens unit change their moving direction midway through zooming from the wide-angle end to the telephoto end.

49 Claims, 9 Drawing Sheets

ZOOM LENS AND PHOTOGRAPHING APPARATUS HAVING IT

BACKGROUND OF THE INVENTION

1. Field of the Invention

The present invention relates to a zoom lens and a photographing apparatus using it and, more particularly, to those suitably applicable to a photographing apparatus, such as photographic cameras, video cameras, digital cameras, SV (still video) cameras, and so on, which has a plurality of lens units including a leading lens component of negative refractive power (optical power) and in which high optical performance is realized across the entire zooming range by properly setting the lens configuration, the zoom type, etc. of these lens units.

2. Related Background Art

Zoom lenses of various types have been used heretofore in the photographing apparatus such as the photographic cameras, video cameras, and so on.

Among them, the zoom lenses of a so-called negative lead type having a leading lens component of negative refractive power are commonly used as standard zoom lenses for many cameras because of their relative easiness of increase in the angle of view.

As the standard zoom lenses of this type, there are proposals of so-called two-unit zoom lenses wherein two lens units consist of a first unit of negative refractive power and a second unit of positive refractive power and wherein these two lens units are moved along the optical axis to change the spacing between the lens units so as to effect zooming, for example, as described in Japanese Patent Application Laid-Open No. 53-132360 (corresponding to U.S. Pat. No. 4,299,452), Japanese Patent Application Laid-Open No. 56-19022 (corresponding to U.S. Pat. No. 4,370,031), U.S. Pat. No. 5,283,639, and so on.

Further, Japanese Patent Application Laid-Open No. 07-52256 suggests the zoom lens which has three lens units consisting of a first unit of negative refractive power, a second unit of positive refractive power, and a third unit of positive refractive power, arranged in the order named from the object side, and in which the spacing between the second unit and the third unit is increased to effect zooming from the wide-angle end to the telephoto end.

U.S. Pat. No. 5,434,710 discloses the zoom lens which has three lens units consisting of a first unit of negative refractive power, a second unit of positive refractive power, and a third unit of positive refractive power, arranged in the order named from the object side, and in which the spacing between the second unit and the third unit is decreased to effect zooming from the wide-angle end to the telephoto end.

Applicant filed Japanese Patent Application Laid-Open No. 06-27377 to propose the multi-unit zoom lenses consisting of three or more units.

Japanese Patent Applications Laid-Open No. 05-72472 (corresponding to U.S. Pat. No. 5,572,364) and Laid-Open No. 07-270684 (corresponding to U.S. Pat. No. 5,963,378) disclose the four-unit zoom lenses which have a first unit of positive refractive power fixed on the occasion of zooming and focusing, a second unit of negative refractive power moving for zooming, a third unit of positive refractive power fixed and having a converging action, and a fourth unit of positive refractive power moving on the optical axis in order to keep the image plane position from moving with zooming, which are arranged in the order named from the object side.

Recently, there are demands for zoom lenses having a predetermined zoom ratio, including a wide angle of view, and having a compact overall lens system as those used in the photographing apparatus such as single-lens reflex cameras, video cameras, and so on.

In general, the zoom lenses of the negative lead type in which the front component of negative refractive power and the rear component of positive refractive power are constructed of two lens units have such features that it is relatively easy to increase the angle of view and that predetermined back focus is assured readily.

In the two-unit zoom lenses consisting of only two lens units, however, the relative positions of the two units are uniquely determined on the optical axis from restrictions on zooming and on the image plane position and it is difficult to control the optical performance at zoom positions midway through zooming from the wide-angle end to the telephoto end. For this reason, in order to improve the optical performance at the positions midway through the zooming, it is necessary to keep variations in aberration as small at each of the units during the zooming operation as possible. For accomplishing this, the refractive power of each unit needs to be set to be gentle, or each unit needs to consist of the larger number of lenses. However, this method will result in increasing the entire length of the lens.

The four-unit zoom lenses consisting of a first unit of positive refractive power fixed during zooming, a second unit of negative refractive power acting as a zooming unit monotonically moving during zooming, a third unit of positive refractive power fixed during zooming, and a fourth unit of positive refractive power acting as an image-plane correcting unit moving during zooming, had problems including the problem that the power of the second unit became strong, because the zooming was effected substantially by only the second unit, thereby making it difficult to suppress the variations in aberration during zooming, because the image plane correction was implemented by only the fourth unit, and so on.

SUMMARY OF THE INVENTION

An object of the present invention is to provide a zoom lens capable of demonstrating excellent optical performance at any zoom position in the zooming range and capable of readily achieving high optical performance throughout the entire zooming range and throughout the entire view-angle range, by properly setting the lens configuration of each lens unit in a zoom lens of the negative lead type having a leading lens component of negative refractive power, and a photographing apparatus using it.

In order to accomplish the above object, a zoom lens according to one embodiment of the present invention is a zoom lens comprising the following lens components in the order named from the object side:

a front lens component of a negative optical power, the front lens component having a first lens unit of a positive optical power and a second lens unit of a negative optical power in the order named from the object side; and a rear lens component of a positive optical power, the rear lens component having a third lens unit of a positive optical power and a fourth lens unit of a positive optical power in the order named from the object side;

the zoom lens varying the spacing between principal points of the front lens component and the rear lens component by varying the spacing between the first lens unit and the second lens unit and the spacing between the third lens unit and the fourth lens unit, in order to effect zooming, and wherein the first lens unit and the fourth lens unit change their moving direction midway through zooming from the wide-angle end to the telephoto end.

Another zoom lens according to another embodiment of the present invention is a zoom lens comprising the following lens components in the order named from the object side:

a front lens component of a negative optical power, the front lens component having a first lens unit of a positive optical power and a second lens unit of a negative optical power in the order named from the object side; and a rear lens component of a positive optical power, the rear lens component having a third lens unit of a positive optical power and a fourth lens unit of a positive optical power in the order named from the object side;

the zoom lens varying the spacing between principal points of the front lens component and the rear lens component by varying the spacing between the first lens unit and the second lens unit and the spacing between the third lens unit and the fourth lens unit, in order to effect zooming, wherein the fourth lens unit changes its moving direction midway through zooming from the wide-angle end to the telephoto end, and wherein the first lens unit consists of a lens element of a positive optical power.

Another zoom lens according to another embodiment of the present invention is a zoom lens comprising the following lens components in the order named from the object side:

a front lens component of a negative optical power, the front lens component having a first lens unit of a positive optical power and a second lens unit of a negative optical power in the order named from the object side; and a rear lens component of a positive optical power, the rear lens component having a third lens unit of a positive optical power and a fourth lens unit of a positive optical power in the order named from the object side;

the zoom lens varying the spacing between principal points of the front lens component and the rear lens component by varying the spacing between the first lens unit and the second lens unit and the spacing between the third lens unit and the fourth lens unit, in order to effect zooming, wherein the fourth lens unit changes its moving direction midway through zooming from the wide-angle end to the telephoto end, and the zoom lens comprising a stop, which moves together with the third lens unit during zooming, on the object side of the third lens unit.

Another zoom lens according to another embodiment of the present invention is a zoom lens comprising the following lens components in the order named from the object side:

a front lens component of a negative optical power, the front lens component having a first lens unit of a positive optical power and a second lens unit of a negative optical power in the order named from the object side; and a rear lens component of a positive optical power, the rear lens component having a third lens unit of a positive optical power and a fourth lens unit of a positive optical power in the order named from the object side;

the zoom lens varying the spacing between principal points of the front lens component and the rear lens component by varying the spacing between the first lens unit and the second lens unit and the spacing between the third lens unit and the fourth lens unit, in order to effect zooming, and wherein the second lens unit changes its moving direction midway through zooming from the wide-angle end to the telephoto end.

DETAILED DESCRIPTION OF THE PREFERRED EMBODIMENTS

Figure 1:
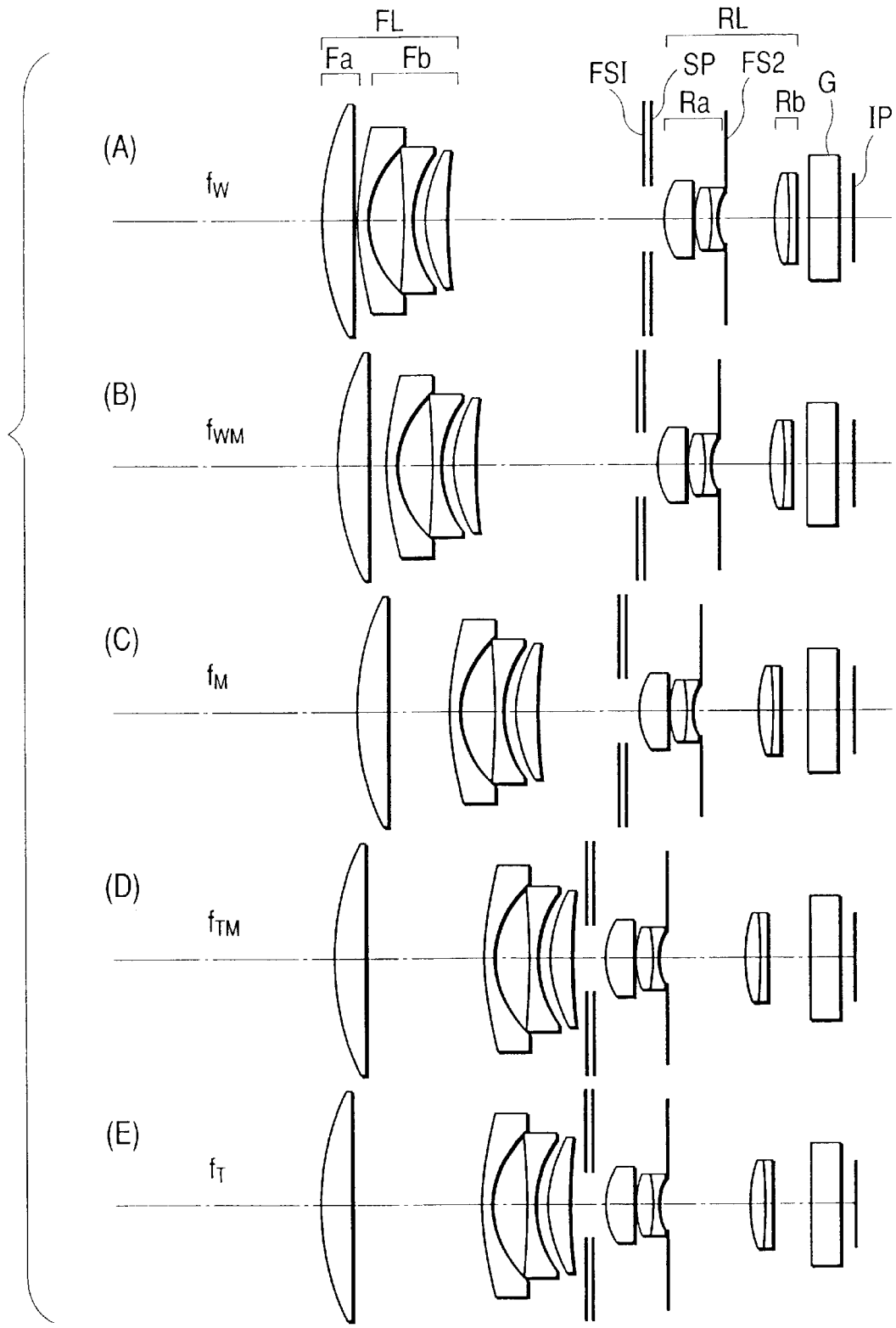
FIG. 1 shows lens sectional views of the zoom lens in Numerical Example 1.
Figure 2:
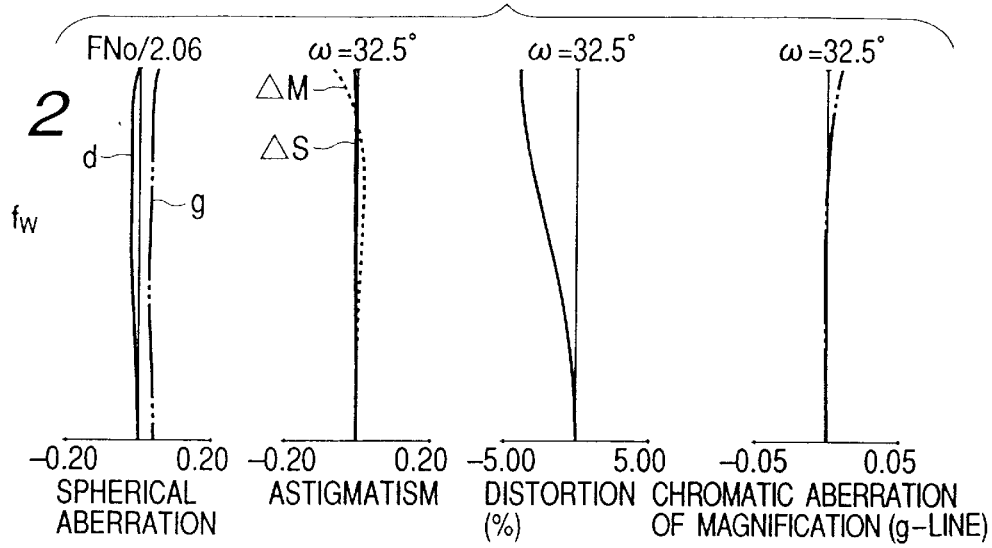
FIG. 2 shows aberration diagrams at the wide-angle end of the zoom lens in Numerical Example 1.
Figure 3:
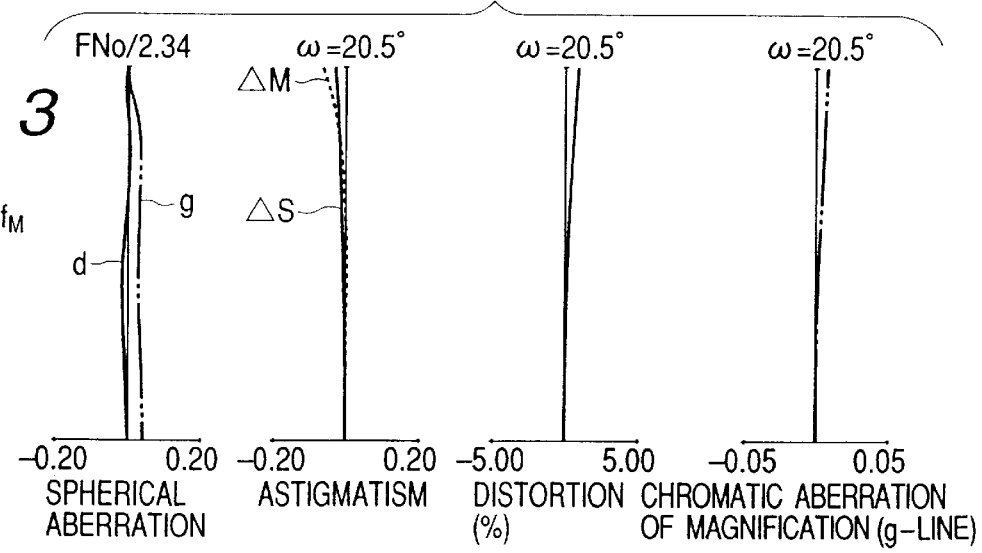
FIG. 3 shows aberration diagrams at the middle focal length position of the zoom lens in Numerical Example 1.
Figure 4:
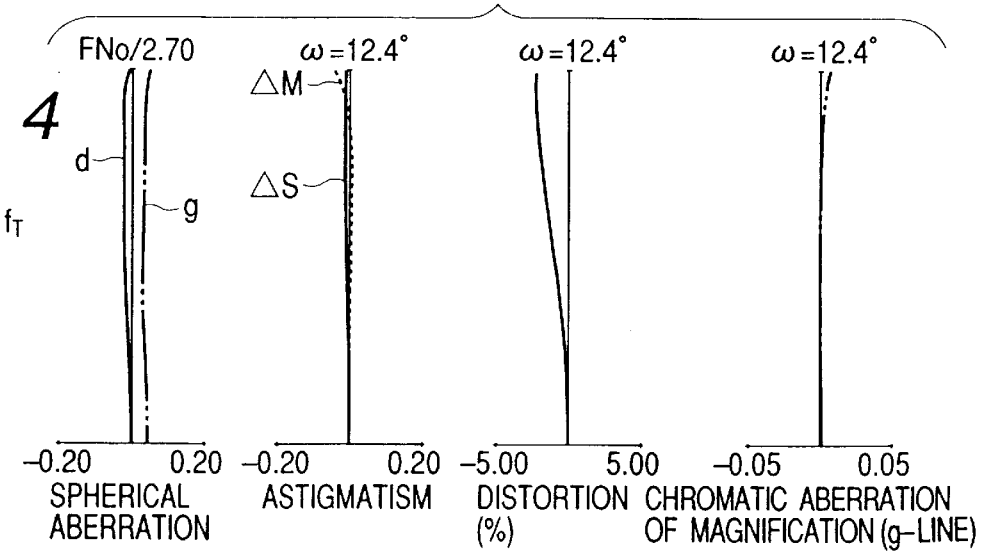
FIG. 4 shows aberration diagrams at the telephoto end of the zoom lens in Numerical Example 1.
Figure 5:
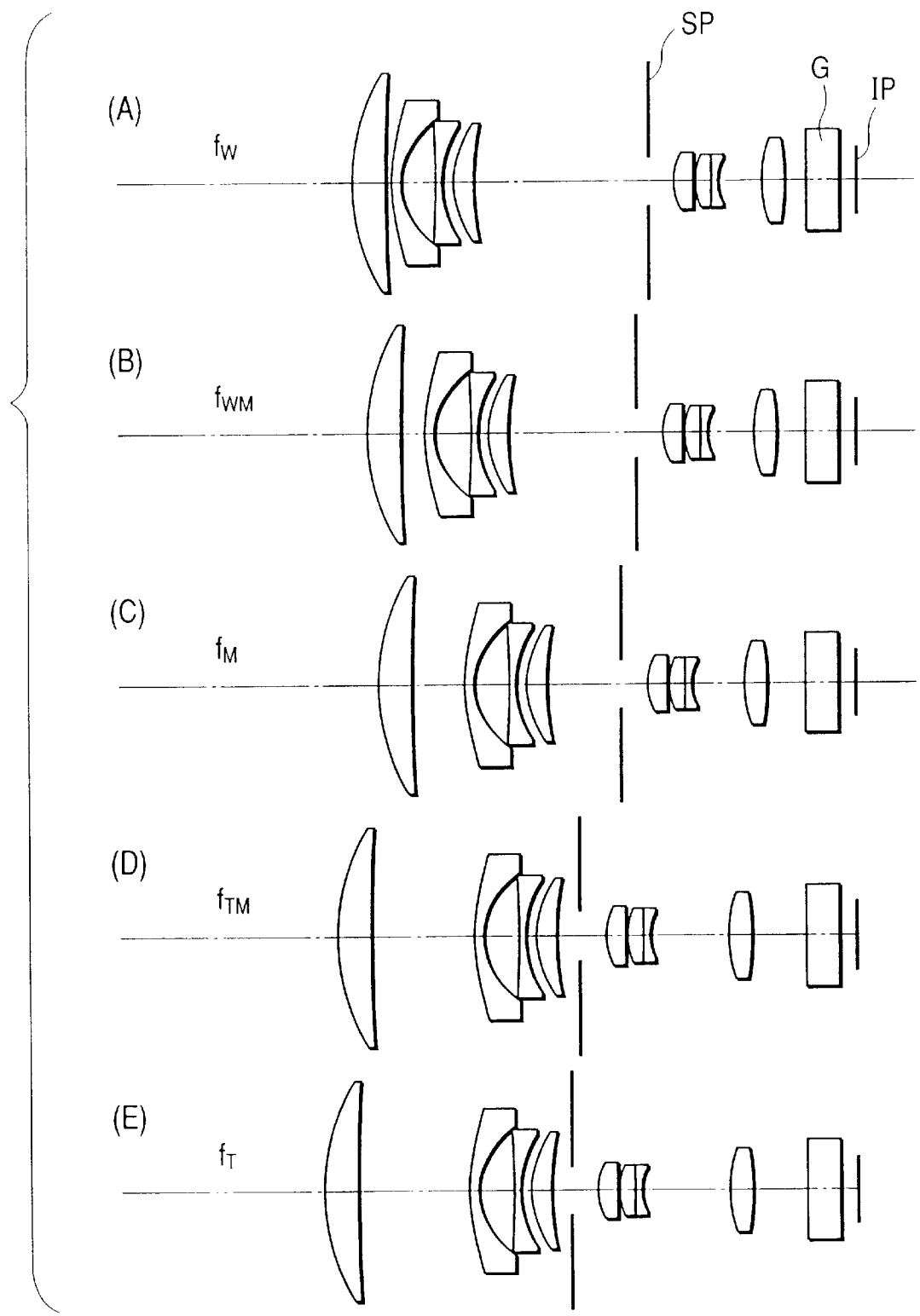
FIG. 5 shows lens sectional views of the zoom lens in Numerical Example 2.
Figure 6:
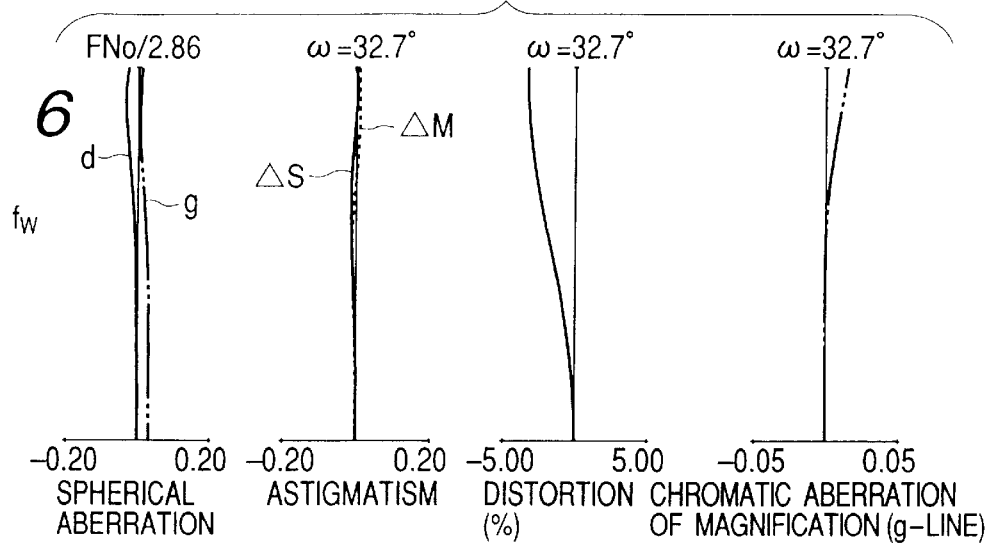
FIG. 6 shows aberration diagrams at the wide-angle end of the zoom lens in Numerical Example 2.
Figure 7:
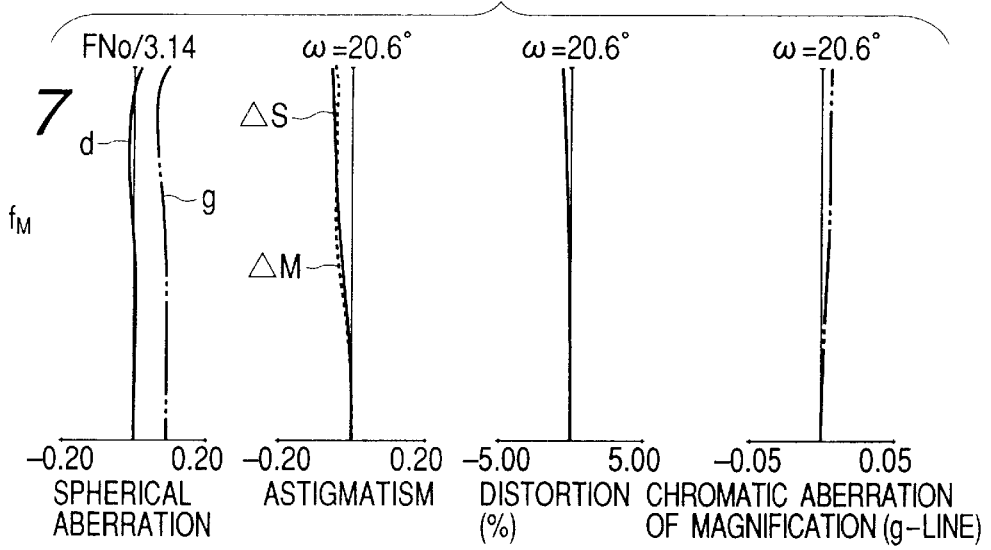
FIG. 7 shows aberration diagrams at the middle focal length position of the zoom lens in Numerical Example 2.
Figure 8:
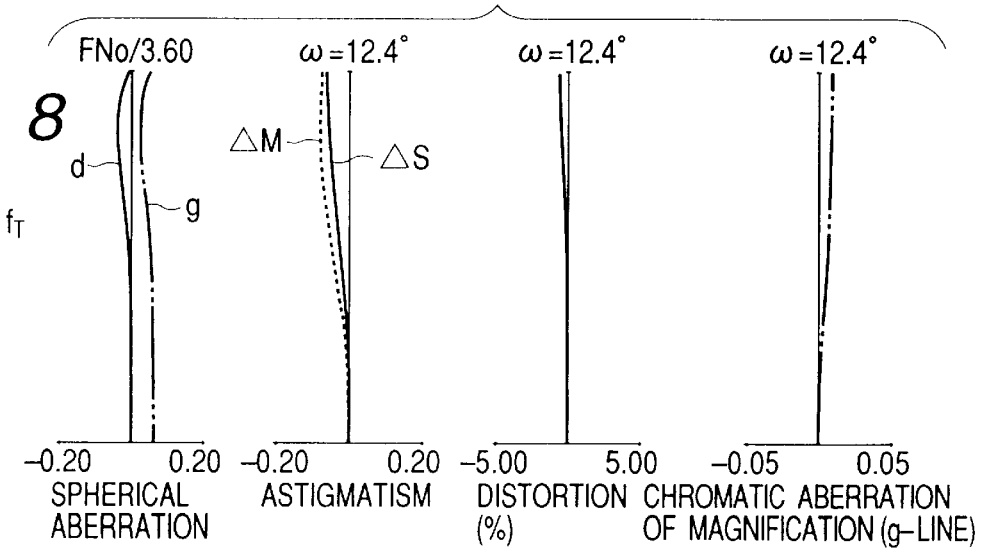
FIG. 8 shows aberration diagrams at the telephoto end of the zoom lens in Numerical Example 2.
Figure 9:
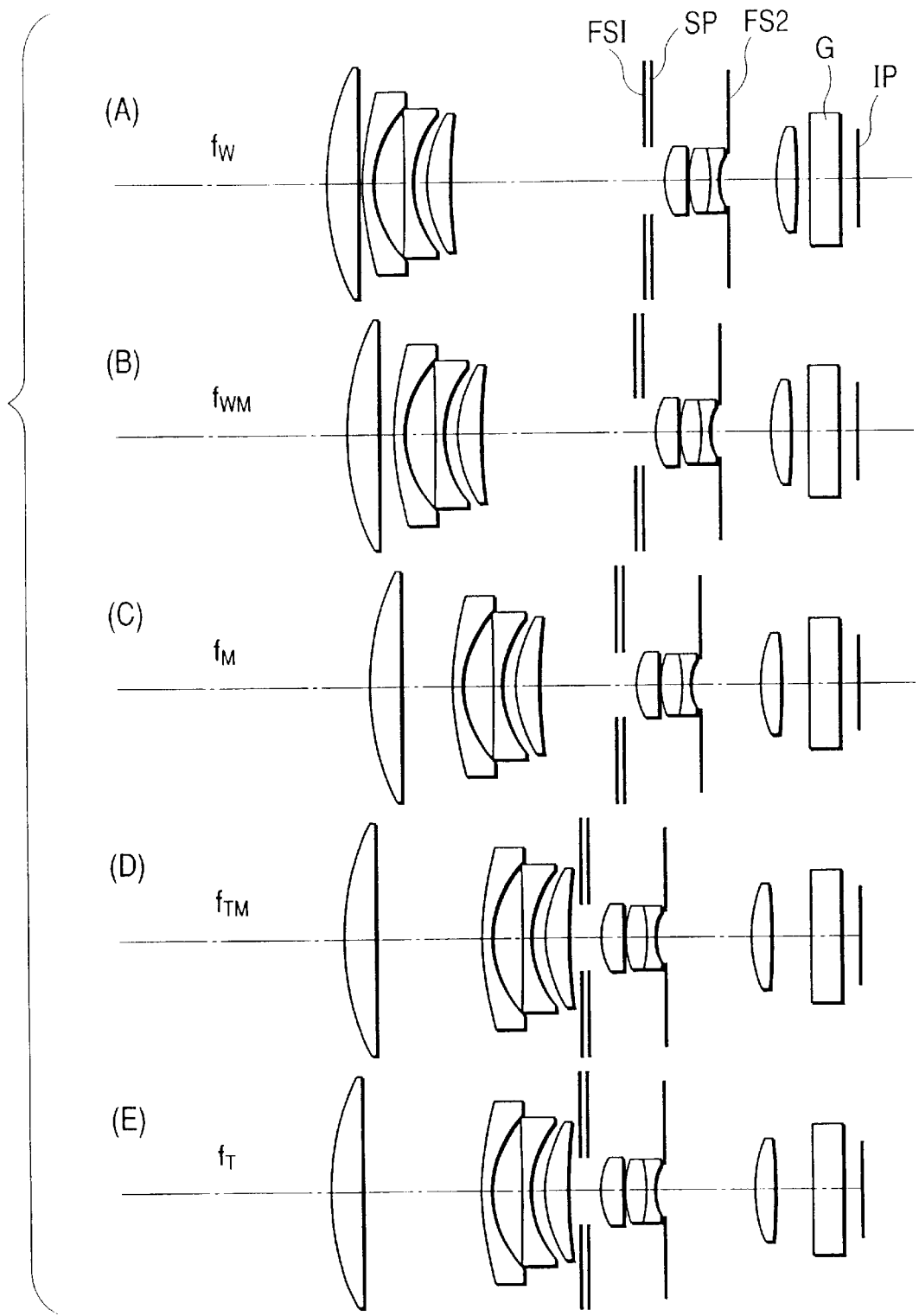
FIG. 9 shows lens sectional views of the zoom lens in Numerical Example 3.
Figure 10:
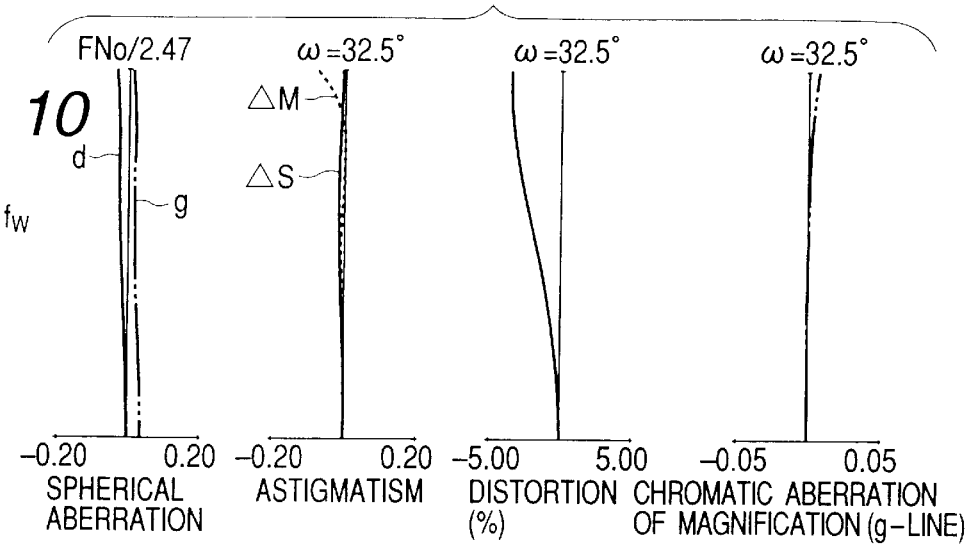
FIG. 10 shows aberration diagrams at the wide-angle end of the zoom lens in Numerical Example 3.
Figure 11:
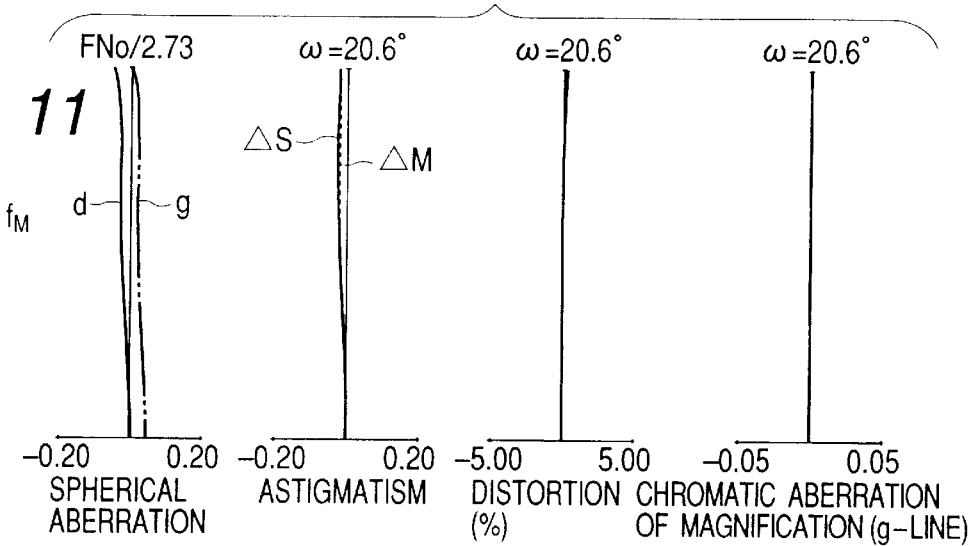
FIG. 11 shows aberration diagrams at the middle focal length position of the zoom lens in Numerical Example 3.
Figure 12:
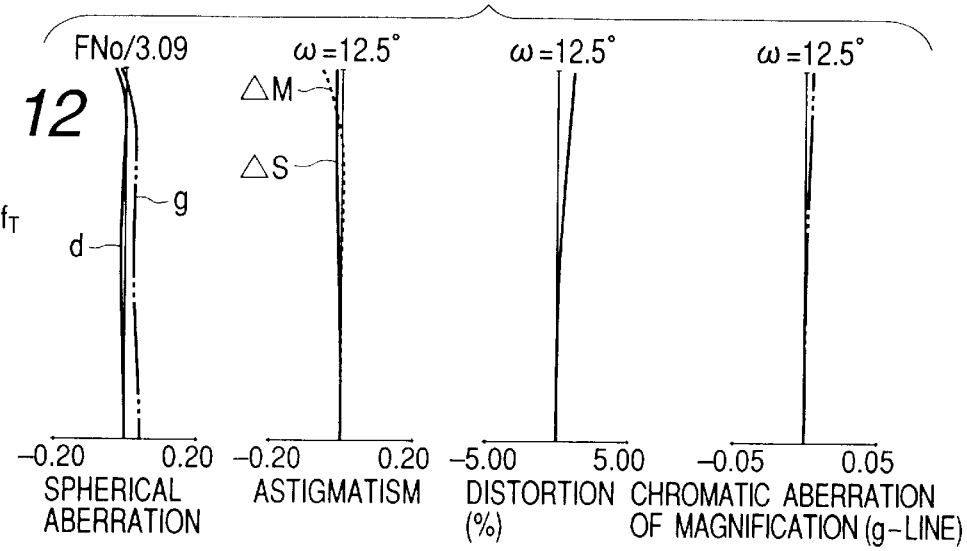
FIG. 12 shows aberration diagrams at the telephoto end of the zoom lens in Numerical Example 3.
Figure 13:
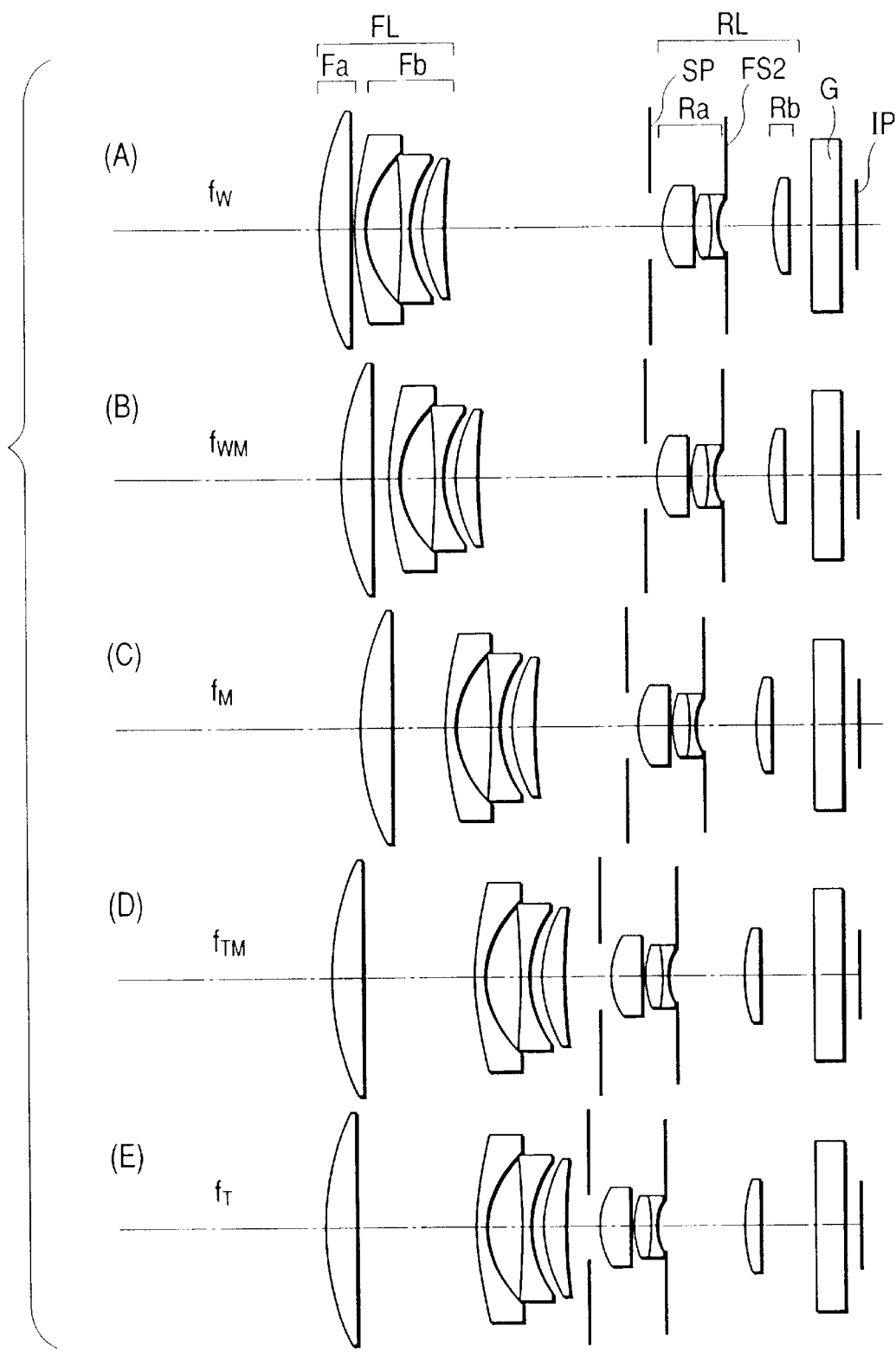
FIG. 13 shows lens sectional views of the zoom lens in Numerical Example 4.
Figure 14:
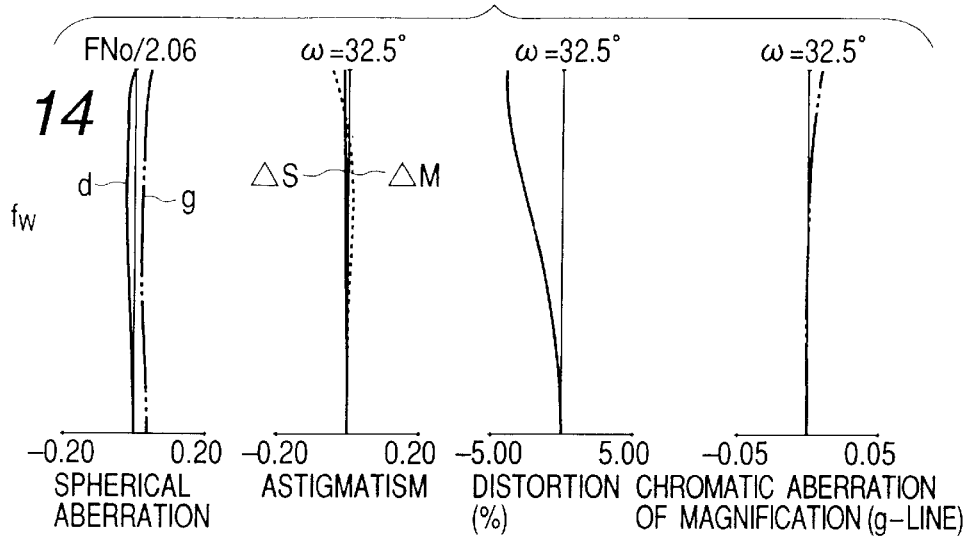
FIG. 14 shows aberration diagrams at the wide-angle end of the zoom lens in Numerical Example 4.
Figure 15:
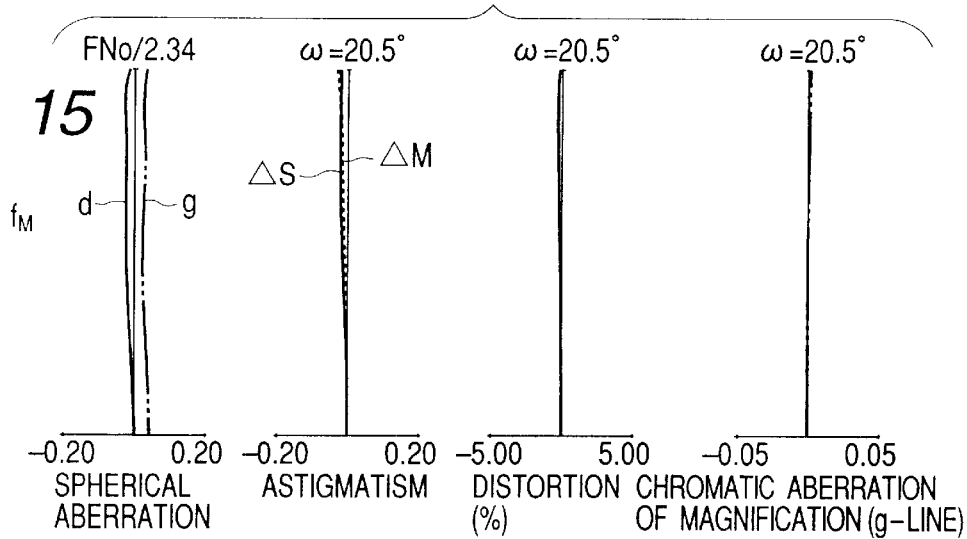
FIG. 15 shows aberration diagrams at the middle focal length position of the zoom lens in Numerical Example 4.
Figure 16:
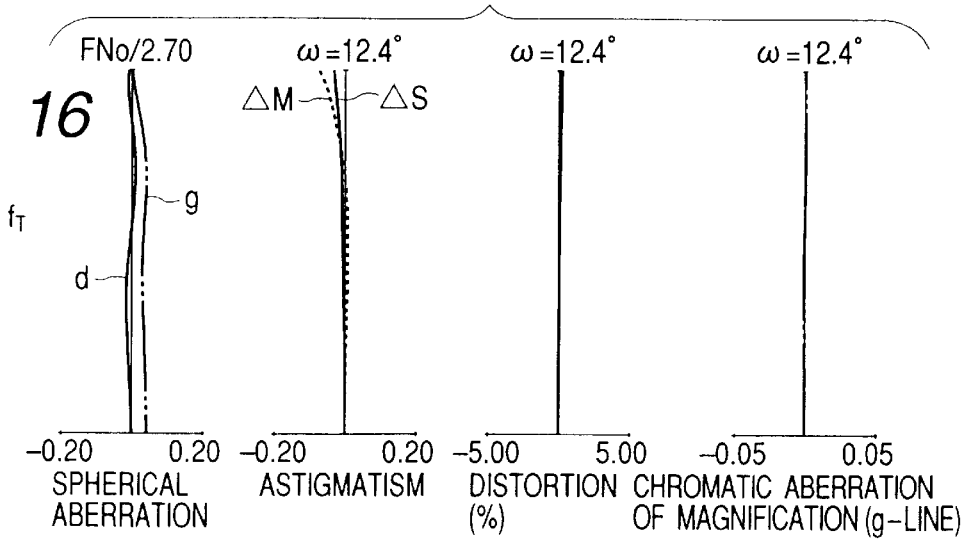
FIG. 16 shows aberration diagrams at the telephoto end of the zoom lens in Numerical Example 4.

FIG. 1, FIG. 2, FIG. 3, and FIG. 4 are the lens sectional views and aberration diagrams of the zoom lens in Numerical Example 1. FIG. 5, FIG. 6, FIG. 7, and FIG. 8 are the lens sectional views and aberration diagrams of the zoom lens in Numerical Example 2. FIG. 9, FIG. 10, FIG. 11, and FIG. 12 are the lens sectional views and aberration diagrams of the zoom lens in Numerical Example 3. FIG. 13, FIG. 14, FIG. 15, and FIG. 16 are the lens sectional views and aberration The photographing apparatus of the present embodiment forms an object image on an image pickup means consisting of photoelectric conversion elements, such as CCD or the like, by use of the zoom lens illustrated in FIG. 1, FIG. 5, FIG. 9, or FIG. 13. In the lens sectional views illustrated in FIGS. 1, 5, 9, and 13, (A) shows a state at the wide-angle end (or at the focal length $f_W$), (B) shows a state at a zoom position between the wide-angle end and the middle focal length (or at the focal-length $f_{WM}$), (C) shows a state at the zoom position of the middle focal length (or at the focal length $f_M$), (D) shows a state at a zoom position between the middle focal length and the telephoto end (or at the focal length $f_{TM}$), and (E) shows a state at the telephoto end (or at the focal length $f_T$).

FIG. 2, FIG. 6, FIG. 10, and FIG. 14 are the aberration diagrams of the respective numerical examples at the wide-angle end (or at the focal length $f_W$), FIG. 3, FIG. 7, FIG. 11, and FIG. 15 are the aberration diagrams of the respective numerical examples at the zoom position of the middle focal length (or at the focal length $f_M$), and FIG. 4, FIG. 8, FIG. 12, and FIG. 16 are the aberration diagrams of the respective numerical examples at the telephoto end (or at the focal length $f_T$).

In the lens sectional views illustrated in FIGS. 1, 5, 9, and 13, FL designates a front lens component of a negative refractive power as a whole, which has an Fa unit (first lens unit) of a positive refractive power and an Fb unit (second lens unit) of a negative refractive power.

RL denotes a rear lens component of a positive refractive power as a whole, which has an Ra unit (third lens unit) of a positive refractive power and an Rb unit (fourth lens unit) of a positive refractive power. SP indicates an aperture stop to determine brightness, and IP the image plane. G denotes a glass block such as a filter, a face plate, or the like. FS1 and FS2 represent flare cutting stops, which are designed to move together with the Ra unit during the zooming operation.

In the zoom lenses of the present invention the Fa unit, Fb unit, Ra unit, and Rb unit are moved on the optical axis during the zooming operation from the wide-angle end to the telephoto end.

Although the zoom lenses of the present invention are handled as those of the two lens component structure, they may also be handled as zoom lenses consisting of four lens units, because the four lens units are moved independently during the zooming operation.

In the zoom lenses of the present embodiment, the entire lens system consists of at least four lens units and the zooming operation is carried out by moving each of the lens units. Particularly, the moving path of the Fb unit of the front lens component and/or the moving path of the Rb unit of the rear lens component involves turning during the zooming operation, thereby weakening the refractive power of each unit and improving the optical performance midway through the zooming operation without increasing the size of the entire lens system. The turning of the moving path during the zooming operation of the Fb unit and/or the Rb unit allows the entire lens system to be made compact while maintaining the optical performance midway through the zooming operation in the simple lens structure of each unit.

Particularly, during the zooming operation from the wide-angle end to the telephoto end of the entire lens system, the Fb unit undergoes the turning of the moving path with respect to the image plane IP of the entire lens system to change its direction from movement toward the image side to movement toward the object side, whereby the Fb unit is provided with image plane correcting action after the turning of the moving path.

This decreases variations in the optical performance in cooperation with the image plane correcting action of the lens units other than the Fb unit.

Particularly, during the zooming operation from the wide-angle end to the telephoto end of the entire lens system, the Rb unit undergoes the turning of the moving path with respect to the image plane IP of the entire lens system to change its direction from movement toward the object side to movement toward the image side, whereby the Rb unit is provided with a multiplication action after the turning of the moving path. This allows a decrease in the zooming action at the Fb unit and at the Ra unit and a decrease in moving amounts of the respective units, thereby permitting the entire lens system to be made compact.

Particularly, change is reduced in the spacing between the Fb unit and the Ra unit for zooming near the telephoto end, so as to reduce the change in the spacing between the Fb unit and the Ra unit due to errors of zoom stop positions. This allows the margin of the spacing to be decreased between the Fb unit and the Ra unit, so as to reduce the size of the entire lens system.

Further, the variations in the optical performance midway through zooming are suppressed more by also turning the moving path of the Fa unit in the front lens component FL around. Particularly, during the zooming operation from the wide-angle end to the telephoto end, the Fa unit undergoes the turning of the moving path with respect to the image plane IP of the entire lens system to change its direction from movement toward the image side to movement toward the object side, thereby permitting the entire lens system to be made compact and improvement in the optical performance midway through zooming.

Particularly, change is reduced in the spacing between the Fa unit and the Fb unit for zooming near the wide-angle end, so as to decrease the change in the spacing between the Fa unit and the Fb unit due to errors of zoom stop positions. This permits the margin of the spacing to be decreased between the Fa unit and the Fb unit, thereby decreasing the size of the entire lens system.

The present embodiment makes it possible to improve the optical performance midway through zooming and also makes it possible to effect good aberration correction by constructing the Fa unit of only one positive lens. The size of the entire lens system is decreased by constructing the Fa unit of only one lens.

The rear lens component RL is a lens component bearing the imaging action of the entire lens system, and the Ra unit in the rear lens component is constructed of a positive lens and a negative lens whereby chromatic aberration is corrected well. In addition, at least one aspherical surface is used in the Ra unit, which simplifies the lens structure and allows it to be made compact.

Further, improvement is permitted in the optical performance midway through zooming and good aberration correction can be made by constructing the Rb unit of only one positive lens. The size of the entire lens system is decreased by constructing the Rb unit of only one lens.

The Rb unit may be constructed of two lenses, a positive lens and a negative lens, which facilitates better aberration correction. An aspherical surface may also be used in the Rb unit, which facilitates aberration correction in a simple structure.

The aperture stop SP may be designed to move together with the Ra unit, which facilitates further simplification of the lens barrel structure.

In Numerical Examples 1 and 3, the flare stopper (FS1) moving together with the aperture stop SP is placed at the position immediately before and a little apart from the aperture stop SP, thereby cutting part of light, which will otherwise reach intermediate image heights at the wide-angle end, so as to reduce flare.

In Numerical Examples 1, 3, and 4, the flare stopper (FS2) moving together with the Ra unit is placed at the position immediately after and a little apart from the Ra unit, thereby cutting part of light, which will otherwise reach intermediate image heights at the middle zoom position, so as to reduce the flare.

In all of the numerical examples, focusing can be performed by the Rb unit, but focusing may be performed by only the Fb unit. In other configurations, the Fb unit and Rb unit may be used for focusing selectively at their zoom positions or in a predetermined relation, or focusing may be effected by moving the whole lens system or the image pickup device on the image plane.

In Numerical Examples 1, 2, and 3 the Rb unit is turned around from movement toward the object side to movement toward the image side in the zooming operation from the wide-angle end to the telephoto end.

In Numerical Example 4 the Rb unit is monotonically moved toward the object side in the zooming operation from the wide-angle end to the telephoto end.

An embodiment of the photographing apparatus provided with either of the zoom lenses in Numerical Examples 1 to 4 will be described below referring to FIG. 17A and FIG. 17B.

Figure 17A:
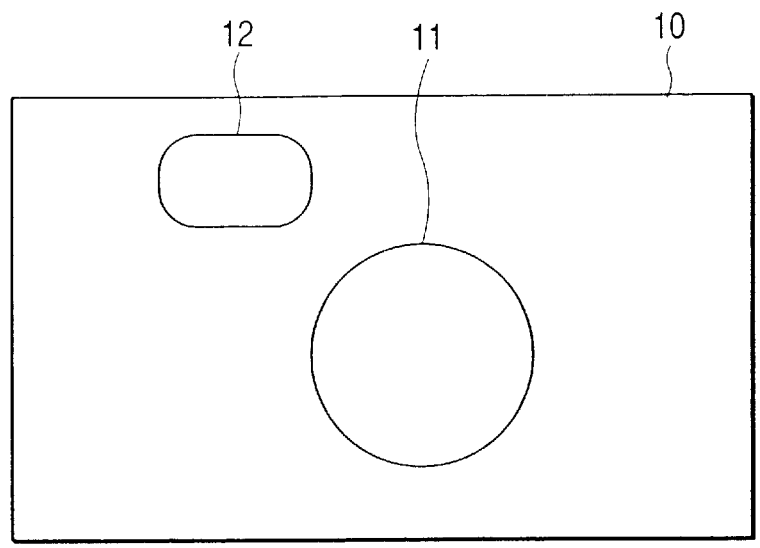
FIGS. 17A and 17B are schematic diagrams of the main part of a photographing apparatus.
Figure 17B:
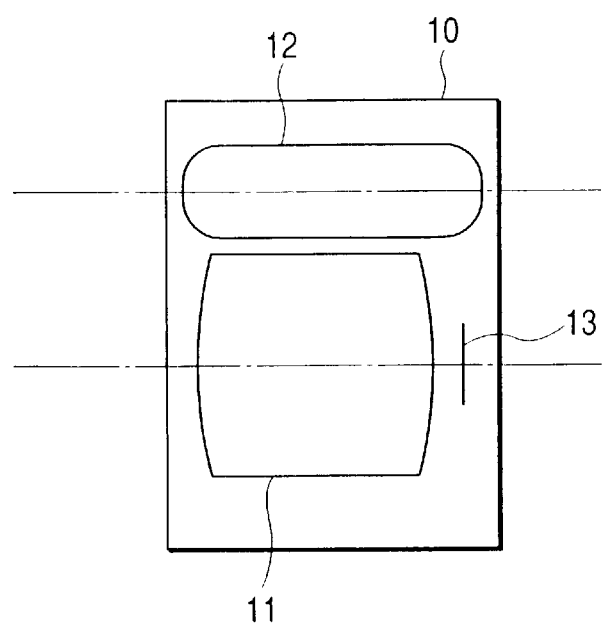

FIG. 17A is a front view of the photographing apparatus and FIG. 17B a cross-sectional side view thereof. In the figures, numeral 10 designates the main body (housing) of the photographing apparatus, 11 denotes a photographing optical system using the zoom lens in either one of Numerical examples 1 to 4, 12 denotes a finder optical system, and 13 denotes an image pickup device such as the CCD or the like.

The compact photographing apparatus is realized by applying the zoom lens in either of Numerical Examples 1 to 4 to the photographing optical system of the photographing apparatus in this way.

The initial purpose of the present invention is accomplished by setting the zoom lenses as described above, but the zoom lenses preferably satisfy at least one of the following conditions in order to further decrease the size of the entire lens system while achieving better optical performance.

(a-1) to satisfy the following condition:

$$0.00 < fw/fFa < 0.20 \quad (1)$$

where fw is the focal length of the entire lens system at the wide-angle end and fFa the focal length of the Fa unit.

Condition (1) concerns the focal length of the Fa unit. Above the upper, limit the power of the Fa unit is too strong and the front lens diameter becomes large. Below the lower limit, the power of the Fa unit is too weak and the zooming action of the Fb unit is weakened to increase moving amounts in the zooming operation. This increases the total lens length, which is not preferable. More preferably, the upper limit and the lower limit of Condition (1) are set as follows.

$$0.03 < fw/fFa < 0.15 \quad (1a)$$

(a-2) to satisfy the following condition:

$$0.35 < fw/|fFb| < 0.80 \quad (2)$$

where fw is the focal length of the entire lens system at the wide-angle end and fFb the focal length of the Fb unit.

Condition (2) concerns the focal length of the Fb unit. Above the upper limit, the power of the Fb unit is too strong and the aberration variations become large during the zooming operation, which will make attainment of a high zoom ratio difficult. Below the lower limit, the power of the Fb unit is too weak and the zooming action of the Fb unit is weakened to increase the moving amounts in the zooming operation. As a result, the total lens length becomes long, which will make compactification of the lens difficult. More desirably, the upper limit and the lower limit of Condition (2) are set as follows.

$$0.40 < fw/|fFb| < 0.60 \quad (2a)$$

(a-3) to satisfy the following condition:

$$0.7 < fRa/fRb < 1.5 \quad (3)$$

where fRa is the focal length of the Ra unit and fRb the focal length of the Rb unit.

Condition (3) relates to a ratio of the focal lengths of the Ra unit and the Rb unit. Below the lower limit the power of the Rb unit is too weak and the aberration variations become large during the zooming operation, which will make attainment of a high zoom ratio difficult. Over the upper limit the power of the Ra unit is too weak on the other hand and the total lens length becomes long, which will make compactification of lens difficult. More preferably, the upper limit and the lower limit of Condition (3) are set as follows.

$$0.8 < fRa/fRb < 1.2 \quad (3a)$$

(a-4) to satisfy the following condition:

$$0.50 < (Bw-Bm)/(Bw-Bt) < 0.75 \quad (4)$$

where Bw is an axial spacing between the Fb unit and the Ra unit at the wide-angle end, Bt is an axial spacing between the Fb unit and the Ra unit at the telephoto end, and Bm is an axial spacing between the Fb unit and the Ra unit at a zoom position where the focal length of the entire lens system is a geometric mean, $fm=(fw \times ft)^{1/2}$, of the focal length fw at the wide-angle end and the focal length ft at the telephoto end.

Condition (4) concerns the axial spacing between the Fb unit and the Ra unit in the zooming operation. Over the upper limit, the change in the spacing between the Fb unit and the Ra unit becomes large in the wide-angle-side zoom region from the wide-angle end to the middle focal length (fm), which will make attainment of a high zoom ratio of the whole system difficult. Below the lower limit, good aberration correction becomes difficult in the intermediate zoom region. More preferably, the upper limit and the lower limit of Condition (4) are set as follows.

$$0.60 < (Bw-Bm)/(Bw-Bt) < 0.70 \quad (4a)$$

(a-5) to satisfy the following condition:

$$Cw < Cm < Ct \quad (5)$$

where Cw is an axial spacing between the Ra unit and the Rb unit at the wide-angle end, Ct an axial spacing between the Ra unit and the Rb unit at the telephoto end, and Cm is an axial spacing between the Ra unit and the Rb unit at a zoom position where the focal length of the entire lens system is a geometric mean, $fm=(fw \times ft)^{1/2}$, of the focal length fw at the wide-angle end and the focal length ft at the telephoto end.

Condition (5) concerns the axial spacing between the Ra unit and the Rb unit in the zooming operation. If Cm is over the upper limit, it will be difficult to correct various aberrations occurring in the Ra unit, particularly, to correct axial chromatic aberration by the Rb unit and it will be difficult to effect good aberration correction while constructing both the Ra unit and the Rb unit in a simple structure.

If Cm is below the lower limit, the spacing between Ra unit and the Rb unit will be large at the wide-angle end and it will be thus difficult to maintain sufficient back focus.

More preferably, the upper limit and the lower limit of Condition (5) are set as follows.

$$1.1 \times Cw < Cm < 0.9 \times Ct \tag{5a}$$

(a-6) to construct the Fa unit of a positive lens with a convex surface on the object side.

(a-7) to construct the Fb unit of a negative meniscus lens with a convex surface on the object side, a negative lens, and a positive meniscus lens with a convex surface on the object side.

(a-8) to construct the Ra unit of a positive lens, and a doublet of a positive lens and a negative lens.

Data of Numerical Examples 1 to 4 will be presented below. In each of the numerical examples ri represents the radius of curvature of the ith surface when counted in order from the object side, di denotes the spacing between the ith surface and the (i+1)th surface when counted in order from the object side, and ni and vi denote the refractive index and Abbe's number, respectively, of the ith optical member when counted in order from the object side. In the numerical examples the last two planes indicate surfaces of the glass block.

The aspherical shape is expressed by the following equation where R is the radius of curvature of the lens surface in the central part, the X-axis is taken along the optical-axis direction (the traveling direction of light), the Y-axis is taken along the direction normal to the optical axis, and A, B, C, D, and E are aspherical coefficients.

$$X = [(1/R)Y^2]/[1 + \{1 - (1+K)(Y/R)^2\}^{1/2}] + AY^2 + BY^4 + CY^6 + DY^8 + EY^{10}$$

Further, "e-X" means "$\times 10^{-X}$."

Table 1 is a table to show the relation between each of the above-stated conditions and numerical values in the numerical examples.

[Numerical Example 1]

| | | | | | | | | | |
|---|---|---|---|---|---|---|---|---|---|
| f = 7.13 to 20.74 | | FNo = 1:2.06 to 2.70 | | | 2ω = 65.1° to 24.7° | | | | |

| | | | | | | | | | |
|---|---|---|---|---|---|---|---|---|---|
| Fa | r1 = | 35.215 | | d1 = | 3.70 | n1 = | 1.51633 | v1 = | 64.1 |
| | r2 = | ∞ | | d2 = | variable | | | | |
| Fb | r3 = | 43.552 | | d3 = | 1.10 | n2 = | 1.74950 | v2 = | 35.3 |
| | r4 = | 11.329 | | d4 = | 4.47 | | | | |
| | r5 = | −93.546 | | d5 = | 1.00 | n3 = | 1.69350 | v3 = | 53.2 |
| | r6 = | 13.702 | | d6 = | 1.61 | | | | |
| | r7 = | 15.920 | | d7 = | 2.70 | n4 = | 1.84666 | v4 = | 23.9 |
| | r8 = | 61.680 | | d8 = | variable | | | | |
| | r9 = | ∞ (FS1) | | d9 = | 0.90 | | | | |
| | r10 = | ∞ (stop) | | d10 = | 1.40 | | | | |
| Ra | r11 = | 9.378 | | d11 = | 3.50 | n5 = | 1.88300 | v5 = | 40.8 |
| | r12 = | 209.089 | | d12 = | 0.20 | | | | |
| | r13 = | 11.069 | (aspherical surface) | d13 = | 2.15 | n6 = | 1.74330 | v6 = | 49.3 |
| | r14 = | −21.135 | | d14 = | 0.50 | n7 = | 1.84666 | v7 = | 23.9 |
| | r15 = | 5.994 | | d15 = | 1.20 | | | | |
| Rb | r16 = | ∞ (FS2) | | d16 = | variable | | | | |
| | r17 = | 16.383 | (aspherical surface) | d17 = | 2.10 | n8 = | 1.80610 | v8 = | 40.7 |
| | r18 = | −41.934 | | d18 = | 0.80 | n9 = | 1.58144 | v9 = | 40.8 |
| | r19 = | ∞ | | d19 = | variable | | | | |
| | r20 = | ∞ | | d20 = | 3.39 | n10 = | 1.51633 | v10 = | 64.1 |
| | r21 = | ∞ | | | | | | | |

| | | $f_W$ | $f_{WM}$ | $f_M$ | $f_{TM}$ | $f_T$ |
|---|---|---|---|---|---|---|
| variable distance\ | \focal length | 7.13 | 8.15 | 12.16 | 19.90 | 20.74 |
| | d2 | 0.60 | 2.14 | 7.60 | 14.65 | 16.18 |
| | d8 | 24.27 | 19.98 | 10.06 | 1.70 | 1.84 |
| | d16 | 5.76 | 5.93 | 6.76 | 9.38 | 9.92 |
| | d19 | 1.57 | 2.00 | 3.32 | 4.96 | 4.67 |

Asperical coefficients

| K | A | B | C | D | E |
|---|---|---|---|---|---|
| 13th surface | | | | | |
| 4.3134e−01 | 0.0000e+00 | −2.4855e−04 | −8.0173e−06 | 2.4656e−07 | −8.5528e−09 |
| 17th surface | | | | | |
| 1.3914e+00 | 0.0000e+00 | −6.8845e−05 | 2.4350e−07 | −1.3222e−08 | 1.6634e−10 |

[Numerical Example 2]

| | | | | | | | | | |
|---|---|---|---|---|---|---|---|---|---|
| | | f = 5.10 to 14.86 | | FNo = 1:2.86 to 3.60 | | 2ω = 65.4° to 24.9° | | | |
| Fa | r1 = | 22.229 | d1 = | 3.20 | n1 = | 1.51633 | v1 = | 64.1 | |
| | r2 = | 209.706 | d2 = | variable | | | | | |
| Fb | r3 = | 22.982 | d3 = | 0.80 | n2 = | 1.83481 | v2 = | 42.7 | |
| | r4 = | 7.148 | d4 = | 3.26 | | | | | |
| | r5 = | 424.550 | d5 = | 0.60 | n3 = | 1.77250 | v3 = | 49.6 | |
| | r6 = | 10.708 | d6 = | 1.20 | | | | | |
| | r7 = | 10.706 | d7 = | 1.90 | n4 = | 1.84666 | v4 = | 23.9 | |
| | r8 = | 26.443 | d8 = | variable | | | | | |
| | r9 = | ∞ (stop) | d9 = | 2.50 | | | | | |
| Ra | r10 = | 6.681 (aspherical surface) | d10 = | 1.80 | n5 = | 1.80610 | v5 = | 40.7 | |
| | r11 = | −330.515 | d11 = | 0.20 | | | | | |
| | r12 = | 7.031 | d12 = | 1.50 | n6 = | 1.69680 | v6 = | 55.5 | |
| | r13 = | 260.771 | d13 = | 0.50 | n7 = | 1.84666 | v7 = | 23.9 | |
| | r14 = | 3.927 | d14 = | variable | | | | | |
| Rb | r15 = | 13.394 (aspherical surface) | d15 = | 1.90 | n8 = | 1.74330 | v8 = | 49.3 | |
| | r16 = | −44.584 | d16 = | variable | | | | | |
| | r17 = | ∞ | d17 = | 3.12 | n9 = | 1.51633 | v9 = | 64.1 | |
| | r18 = | ∞ | | | | | | | |

| | | $f_W$ | $f_{WM}$ | $f_M$ | $f_{TM}$ | $f_T$ |
|---|---|---|---|---|---|---|
| variable distance\ | \focal length | 5.10 | 6.35 | 8.70 | 14.03 | 14.86 |
| | d2 | 0.60 | 2.50 | 5.20 | 9.94 | 10.80 |
| | d8 | 16.57 | 12.33 | 7.19 | 2.09 | 1.98 |
| | d14 | 4.32 | 4.64 | 5.15 | 7.89 | 8.92 |
| | d16 | 2.19 | 2.74 | 3.75 | 5.11 | 4.99 |

Asperical coefficients

| K | A | B | C | D | E |
|---|---|---|---|---|---|
| 10th surface | | | | | |
| −2.4528e+00 | 0.0000e+00 | 7.1613e−04 | −6.4707e−06 | −1.4291e−07 | 0.0000e+00 |
| 15th surface | | | | | |
| 2.8006e+00 | 0.0000e+00 | −1.5527e−04 | −3.4558e−06 | 2.2626e−08 | 0.0000e+00 |

[Numerical Example 3]

| | | | | | | | | | |
|---|---|---|---|---|---|---|---|---|---|
| | | f = 7.15 to 20.57 | | FNo = 1:2.47 to 3.09 | | 2ω = 64.9° to 24.9° | | | |
| Fa | r1 = | 31.442 | d1 = | 3.70 | n1 = | 1.51633 | v1 = | 64.1 | |
| | r2 = | −593.987 | d2 = | variable | | | | | |
| Fb | r3 = | 46.830 | d3 = | 1.00 | n2 = | 1.83400 | v2 = | 37.2 | |
| | r4 = | 11.259 | d4 = | 3.53 | | | | | |
| | r5 = | −96.580 | d5 = | 0.90 | n3 = | 1.74400 | v3 = | 44.8 | |
| | r6 = | 12.933 | d6 = | 1.47 | | | | | |
| | r7 = | 15.396 | d7 = | 2.80 | n4 = | 1.84666 | v4 = | 23.9 | |
| | r8 = | 113.199 | d8 = | variable | | | | | |
| | r9 = | ∞ (FS1) | d9 = | 0.90 | | | | | |
| | r10 = | ∞ (stop) | d10 = | 1.20 | | | | | |
| Ra | r11 = | 9.078 | d11 = | 2.60 | n5 = | 1.88300 | v5 = | 40.8 | |
| | r12 = | 471.004 | d12 = | 0.20 | | | | | |
| | r13 = | 10.790 (aspherical surface) | d13 = | 2.30 | n6 = | 1.74330 | v6 = | 49.3 | |
| | r14 = | −19.874 | d14 = | 0.90 | | | | | |
| | r15 = | 5.482 | d15 = | 1.20 | n7 = | 1.84666 | v7 = | 23.9 | |
| | r16 = | ∞ (FS2) | d16 = | variable | | | | | |
| Rb | r17 = | 14.961 (aspherical surface) | d17 = | 2.10 | n8 = | 1.80610 | v8 = | 40.7 | |
| | r18 = | −176.170 | d18 = | variable | | | | | |

-continued

| | | | | | | |
|---|---|---|---|---|---|---|
| r19 = ∞ | | d19 = 3.39 | | n9 = 1.51633 | v9 = 64.1 | |
| r20 = ∞ | | | | | | |

| | | $f_W$ | $f_{WM}$ | $f_M$ | $f_{TM}$ | $f_T$ |
|---|---|---|---|---|---|---|
| variable distance\ | \focal length | 7.15 | 8.30 | 12.13 | 19.36 | 20.57 |
| | d2 | 0.60 | 1.69 | 5.84 | 11.90 | 13.46 |
| | d8 | 21.36 | 16.98 | 8.34 | 1.34 | 1.23 |
| | d16 | 5.18 | 5.59 | 6.53 | 9.26 | 9.90 |
| | d18 | 1.61 | 2.00 | 3.21 | 4.43 | 4.16 |

Asperical coefficients

| K | A | B | C | D | E |
|---|---|---|---|---|---|

13th surface

| −1.7822e+01 | 0.0000e+00 | −1.9118e−04 | −6.4554e−06 | 9.5243e−08 | −1.3140e+09 |

17th surface

| 3.9110e+01 | 0.0000e+00 | −4.4984e−05 | −3.4329e−07 | 2.5514e−08 | −4.5423e+10 |

[Numerical Example 4]

| | | | | | |
|---|---|---|---|---|---|
| | f = 7.13 to 20.77 | FNo = 1:2.06 to 2.70 | 2ω = 65.1° to 24.7° | | |
| Fa | r1 = 32.737 | d1 = 3.86 | n1 = 1.51633 | v1 = 64.1 | |
| | r2 = 1134.099 | d2 = variable | | | |
| Fb | r3 = 39.495 | d3 = 1.10 | n2 = 1.74950 | v2 = 35.3 | |
| | r4 = 11.102 | d4 = 4.41 | | | |
| | r5 = −99.295 | d5 = 1.00 | n3 = 1.69350 | v3 = 53.2 | |
| | r6 = 12.887 | d6 = 1.63 | | | |
| | r7 = 15.076 | d7 = 2.61 | n4 = 1.84666 | v4 = 23.9 | |
| | r8 = 49.357 | d8 = variable | | | |
| | r9 = ∞ (stop) | d9 = 1.40 | | | |
| Ra | r10 = 9.538 | d10 = 3.80 | n5 = 1.88300 | v5 = 40.8 | |
| | r11 = 159.782 | d11 = 0.20 | | | |
| | r12 = 11.185 (aspherical surface) | d12 = 2.16 | n6 = 1.74330 | v6 = 49.3 | |
| | r13 = −20.293 | d13 = 0.50 | n7 = 1.84666 | v7 = 23.9 | |
| | r14 = 6.149 | d14 = 1.20 | | | |
| | r15 = ∞ | d15 = variable | | | |
| Rb | r16 = 17.351 (aspherical surface) | d16 = 2.00 | n8 = 1.80610 | v= 40.7 | |
| | r17 = −100.186 | d17 = variable | | | |
| | r18 = ∞ | d18 = 3.39 | n9 = 1.51633 | v9 = 64.1 | |
| | r19 = ∞ | | | | |

| | | $f_W$ | $f_{WM}$ | $f_M$ | $f_{TM}$ | $f_T$ |
|---|---|---|---|---|---|---|
| variable distance\ | \focal length | 7.13 | 8.30 | 12.17 | 18.99 | 20.77 |
| | d2 | 0.60 | 2.20 | 6.77 | 14.00 | 14.75 |
| | d8 | 25.12 | 20.39 | 11.16 | 4.28 | 3.04 |
| | d15 | 5.34 | 5.50 | 6.37 | 8.37 | 9.61 |
| | d17 | 2.69 | 3.23 | 4.64 | 6.06 | 6.35 |

Asperical coefficients

| K | A | B | C | D | E |
|---|---|---|---|---|---|

12th surface

| 8.4152e−01 | 0.0000e+00 | −2.8092e−04 | −7.7773e−06 | 1.9751e−07 | −7.0795e−09 |

16th surface

| 1.4442e+00 | 0.0000e+00 | −5.9997e−05 | 2.5283e−07 | −7.0858e−09 | 4.0300e−11 |

TABLE 1

| Condition | | Example 1 | Example 2 | Example 3 | Example 4 |
|---|---|---|---|---|---|
| (1) | fw/fFa | 0.10 | 0.11 | 0.12 | 0.11 |
| (2) | fw/|Fb| | 0.46 | 0.51 | 0.49 | 0.48 |
| (3) | fRa/fRb | 0.93 | 0.95 | 0.93 | 0.94 |
| (4) | (Bw-Bm)/(Bw-Bt) | 0.63 | 0.64 | 0.65 | 0.63 |
| (5) | Max | 11.12 | 8.92 | 11.10 | 10.81 |
|  | Cm | 7.96 | 5.15 | 7.73 | 7.58 |
|  | Min | 6.96 | 4.32 | 6.38 | 6.54 |
| (5a) | Max | 10.01 | 8.03 | 9.99 | 9.73 |
|  | Cm | 7.96 | 5.15 | 7.73 | 7.58 |
|  | Min | 7.66 | 4.75 | 7.02 | 7.19 |

As described above, the zoom lenses and the photographing apparatus using either of them are attained with good optical performance at any zoom position in the zooming range and with high optical performance readily achieved across the whole zoom range and across the whole view-angle range, by properly setting the lens structure of each lens unit in the negative lead type zoom lenses having the leading lens component of negative refractive power.

What is claimed is:

1. A zoom lens comprising the following lens components in the order named from the object side:

a front lens component of a negative optical power in the entire zoom range, said front lens component having a first lens unit of a positive optical power and a second lens unit of a negative optical power in the order named from the object side; and a rear lens component of a positive optical power in the entire zoom range, said rear lens component having a third lens unit of a positive optical power and a fourth lens unit of a positive optical power in the order named from the object side;

said zoom lens varying a spacing between principal points of said front lens component and rear lens component by varying a spacing between said first lens unit and said second lens unit and a spacing between said third lens unit and said fourth lens unit, in order to effect zooming, and wherein said first lens unit and said fourth lens unit change their moving direction during zooming from the wide-angle end to the telephoto end.

2. The zoom lens according to claim 1, wherein said first lens unit changes its direction from movement toward the image side to movement toward the object side during zooming from the wide-angle end to the telephoto end.

3. The zoom lens according to claim 1, wherein said fourth lens unit changes its direction from movement toward the object side to movement toward the image side during zooming from the wide-angle end to the telephoto end.

4. The zoom lens according to claim 1, wherein said third lens unit has a lens element of a positive optical power and a lens element of a negative optical power and has at least one aspherical surface.

5. The zoom lens according to claim 1, wherein said fourth lens unit consists of a lens element of a positive optical power.

6. The zoom lens according to claim 1, wherein said fourth lens unit consists of a lens element of a positive optical power and a lens element of a negative optical power.

7. The zoom lens according to claim 1, wherein the following condition is satisfied:

$$0.00 < fw/fFa < 0.20$$

where fw is a focal length of the entire system at the wide-angle end and fFa is a focal length of said first lens unit.

8. The zoom lens according to claim 1, wherein the following condition is satisfied:

$$0.35 < fw/|fFb| < 0.80$$

where fw is a focal length of the entire system at the wide-angle end and fFb is the focal length of said second lens unit.

9. The zoom lens according to claim 1, wherein the following condition is satisfied:

$$0.7 < fRa/fRb < 1.5$$

where fRa is a focal length of said third lens unit and fRb is a focal length of said fourth lens unit.

10. The zoom lens according to claim 1, wherein the following condition is satisfied:

$$0.50 < (Bw-Bm)/(Bw-Bt) < 0.75$$

where Bw is a spacing between said second lens unit and said third lens unit at the wide-angle end, Bt is a spacing between said second lens unit and said third lens unit at the telephoto end, and Bm is a spacing between said second lens unit and said third lens unit at a zoom position where a focal length of the entire system is a geometric mean, $fm=(fw \times ft)^{1/2}$, of a focal length fw at the wide-angle end and a focal length ft at the telephoto end.

11. The zoom lens according to claim 1, wherein the following condition is satisfied:

$$Cw < Cm < Ct$$

where Cw is a spacing between said third lens unit and said fourth lens unit at the wide-angle end, Ct is a spacing between said third lens unit and said fourth lens unit at the telephoto end, and Cm is a spacing between said third lens unit and said fourth lens unit at a zoom position where a focal length of the entire system is a geometric mean, $fm=(fw \times ft)^{1/2}$, of a focal length fw at the wide-angle end and a focal length ft at the telephoto end.

12. A zoom lens comprising the following lens components in the order named from the object side:

a front lens component of a negative optical power in the entire zoom range, said front lens component having a first lens unit of a positive optical power and a second lens unit of a negative optical power in the order named from the object side; and a rear lens component of a positive optical power in the entire zoom range, said rear lens component having a third lens unit of a positive optical power and a fourth lens unit of a positive optical power in the order named from the object side;

said zoom lens varying a spacing between principal points of said front lens component and rear lens component by varying a spacing between said first lens unit and said second lens unit and a spacing between said third lens unit and said fourth lens unit, in order to effect zooming, wherein said fourth lens unit changes its moving direction during zooming from the wide-angle end to the telephoto end, wherein said first lens unit consists of a lens element of a positive optical power, and wherein said third lens unit has a lens element of a positive optical power and a lens element of a negative optical power.

13. The zoom lens according to claim 12, wherein said fourth lens unit changes the direction from movement toward the object side to movement toward the image side during zooming from the wide-angle end to the telephoto end.

14. The zoom lens according to claim 12, wherein said third lens unit has a lens element of a positive optical power and a lens element of a negative optical power and has at least one aspherical surface.

15. The zoom lens according to claim 12, wherein said fourth lens unit consists of a lens element of a positive optical power.

16. The zoom lens according to claim 12, wherein said fourth lens unit consists of a lens element of a positive optical power and a lens element of a negative optical power.

17. The zoom lens according to claim 12, wherein the following condition is satisfied:

$$0.00 < fw/fFa < 0.20$$

where fw is a focal length of the entire system at the wide-angle end and fFa is a focal length of said first lens unit.

18. The zoom lens according to claim 12, wherein the following condition is satisfied:

$$0.35 < fw/|fFb| < 0.80$$

where fw is a focal length of the entire system at the wide-angle end and fFb is the focal length of the second lens unit.

19. The zoom lens according to claim 12, wherein the following condition is satisfied:

$$0.7 < fRa/fRb < 1.5$$

where fRa is a focal length of said third lens unit and fRb is a focal length of said fourth lens unit.

20. The zoom lens according to claim 12, wherein the following condition is satisfied:

$$0.50 < (Bw-Bm)/(Bw-Bt) < 0.75$$

where Bw is a spacing between said second lens unit and said third lens unit at the wide-angle end, Bt is a spacing between said second lens unit and said third lens unit at the telephoto end, and Bm is a spacing between said second lens unit and said third lens unit at a zoom position where a focal length of the entire system is a geometric mean, $fm=(fw \times ft)^{1/2}$, of a focal length fw at the wide-angle end and a focal length ft at the telephoto end.

21. The zoom lens according to claim 12, wherein the following condition is satisfied:

$$Cw < Cm < Ct$$

where Cw is a spacing between said third lens unit and said fourth lens unit at the wide-angle end, Ct is a spacing between said third lens unit and said fourth lens unit at the telephoto end, and Cm is a spacing between said third lens unit and said fourth lens unit at a zoom position where a focal length of the entire system is a geometric mean, $fm=(fw \times ft)^{1/2}$, of a focal length fw at the wide-angle end and a focal length ft at the telephoto end.

22. A zoom lens comprising the following lens components in the order named from the object side:

a front lens component of a negative optical power in the entire zoom range, said front lens component having a first lens unit of a positive optical power and a second lens unit of a negative optical power in the order named from the object side; and a rear lens component of a positive optical power in the entire zoom range, said rear lens component having a third lens unit of a positive optical power and a fourth lens unit of a positive optical power in the order named from the object side;

said zoom lens varying a spacing between principal points of said front lens component and rear lens component by varying a spacing between said first lens unit and said second lens unit and a spacing between said third lens unit and said fourth lens unit, in order to effect zooming, wherein said fourth lens unit changes its moving direction during zooming from the wide-angle end to the telephoto end, wherein said zoom lens further comprises a stop, which moves along the optical axis together with said third lens unit during zooming, on the object side of said third lens unit, and wherein said fourth lens unit consists of a lens member of a positive refractive power.

23. The zoom lens according to claim 22, wherein said fourth lens unit changes the direction from movement toward the object side to movement toward the image side during zooming from the wide-angle end to the telephoto end.

24. The zoom lens according to claim 22, wherein said third lens unit has a lens element of a positive optical power and a lens element of a negative optical power and has at least one aspherical surface.

25. The zoom lens according to claim 22, wherein said lens member of said fourth lens unit consists of a lens element of a positive optical power.

26. The zoom lens according to claim 22, wherein said lens member of said fourth lens unit consists of a lens element of a positive optical power and a lens element of a negative optical power.

27. The zoom lens according to claim 22, wherein the following condition is satisfied:

$$0.00 < fw/fFa < 0.20$$

where fw is a focal length of the entire system at the wide-angle end and fFa is a focal length of said first lens unit.

28. The zoom lens according to claim 22, wherein the following condition is satisfied:

$$0.35 < fw/|fFb| < 0.80$$

where fw is a focal length of the entire system at the wide-angle end and fFb is the focal length of the second lens unit.

29. The zoom lens according to claim 22, wherein the following condition is satisfied:

$$0.7 < fRa/fRb < 1.5$$

where fRa is a focal length of said third lens unit and fRb is a focal length of said fourth lens unit.

30. The zoom lens according to claim 22, wherein the following condition is satisfied:

$$0.50 < (Bw-Bm)/(Bw-Bt) < 0.75$$

where Bw is a spacing between said second lens unit and said third lens unit at the wide-angle end, Bt is a spacing between said second lens unit and said third lens unit at the telephoto end, and Bm is a spacing between said second lens unit and said third lens unit at a zoom position where a focal length of the entire system is a geometric mean, $fm=(fw \times ft)^{1/2}$, of a focal length fw at the wide-angle end and a focal length ft at the telephoto end.

31. The zoom lens according to claim 22, wherein the following condition is satisfied:

$$Cw < Cm < Ct$$

where Cw is a spacing between said third lens unit and said fourth lens unit at the wide-angle end, Ct is a spacing between said third lens unit and said fourth lens unit at the telephoto end, and Cm is a spacing between said third lens unit and said fourth lens unit at a zoom position where a focal length of the entire system is a geometric mean, $fm=(fw \times ft)^{1/2}$, of a focal length fw at the wide-angle end and a focal length ft at the telephoto end.

32. A zoom lens comprising the following lens components in the order named from the object side:
   a front lens component of a negative optical power in the entire zoom range, said front lens component having a first lens unit of a positive optical power and a second lens unit of a negative optical power in the order named from the object side; and
   a rear lens component of a positive optical power in the entire zoom range, said rear lens component having a third lens unit of a positive optical power and a fourth lens unit of a positive optical power in the order named from the object side;
   said zoom lens varying a spacing between principal points of said front lens component and rear lens component by varying a spacing between said first lens unit and said second lens unit and a spacing between said third lens unit and said fourth lens unit, in order to effect zooming,
   wherein said second lens unit changes its moving direction during zooming from the wide-angle end to the telephoto end,
   wherein the following condition is satisfied:

$$0.7 < fRa/fRb < 1.5$$

where fRa is a focal length of said third lens unit and fRb is a focal length of said fourth lens unit, and
   wherein while zooming from the wide-angle end to the telephoto end, a spacing between said first lens unit and said fourth lens unit changes nonlinearly.

33. The zoom lens according to claim 32, wherein said second lens unit changes the direction from movement toward the image side to movement toward the object side during zooming from the wide-angle end to the telephoto end.

34. The zoom lens according to claim 32, wherein said first lens unit changes its moving direction during zooming from the wide-angle end to the telephoto end.

35. The zoom lens according to claim 34, wherein said first lens unit changes the direction from movement toward the image side to movement toward the object side during zooming from the wide-angle end to the telephoto end.

36. The zoom lens according to claim 32, wherein said first lens unit consists of a lens element of a positive optical power.

37. The zoom lens according to claim 32, wherein said third lens unit has a lens element of a positive optical power and a lens element of a negative optical power and has at least one aspherical surface.

38. The zoom lens according to claim 32, wherein said fourth lens unit consists of a lens element of a positive optical power.

39. The zoom lens according to claim 32, wherein said fourth lens unit consists of a lens element of a positive optical power and a lens element of a negative optical power.

40. The zoom lens according to claim 32, wherein the following condition is satisfied:

$$0.00 < fw/fFa < 0.20$$

where fw is a focal length of the entire system at the wide-angle end and fFa is a focal length of said, first lens unit.

41. The zoom lens according to claim 32, wherein the following condition is satisfied:

$$0.35 < fw/|fFb| < 0.80$$

where fw is a focal length of the entire system at the wide-angle end and fFb is the focal length of the second lens unit.

42. The zoom lens according to claim 32, wherein the following condition is satisfied:

$$0.50 < (Bw-Bm)/(Bw-Bt) < 0.75$$

where Bw is a spacing between said second lens unit and said third lens unit at the wide-angle end, Bt is a spacing between said second lens unit and said third lens unit at the telephoto end, and Bm is a spacing between said second lens unit and said third lens unit at a zoom position where a focal length of the entire system is a geometric mean, $fm=(fw \times ft)^{1/2}$, of a focal length fw at the wide-angle end and a focal length ft at the telephoto end.

43. The zoom lens according to claim 32, wherein the following condition is satisfied:

$$Cw < Cm < Ct$$

where Cw is a spacing between said third lens unit and said fourth lens unit at the wide-angle end, Ct is a spacing between said third lens unit and said fourth lens unit at the telephoto end, and Cm is a spacing between said third lens unit and said fourth lens unit at a zoom position where a focal length of the entire system is a geometric mean, $fm=(fw \times ft)^{1/2}$, of a focal length fw at the wide-angle end and a focal length ft at the telephoto end.

44. A photographing apparatus comprising:
   the zoom lens according to claim 1; and
   an image pickup element for receiving an image formed by said zoom lens.

45. A photographing apparatus comprising:
   the zoom lens according to claim 12; and an image pickup element for receiving an image formed by said zoom lens.

46. A photographing apparatus comprising:

the zoom lens according to claim 22; and an image pickup element for receiving an image formed by said zoom lens.

47. A photographing apparatus comprising:

the zoom lens according to claim 32; and an image pickup element for receiving an image formed by said zoom lens.

48. A zoom lens comprising the following lens components in the order named from the object side:

a front lens component of a negative optical power in the entire zoom range, said front lens component having a first lens unit of a positive optical power and a second lens unit of a negative optical power in the order named from the object side, all lens elements having negative optical power included in the second lens unit being structured such that the optical power of the image-side surface is larger than the optical power of the object-side surface;

a rear lens component of a positive optical power in the entire zoom range, said rear lens component having a third lens unit of a positive optical power and a fourth lens unit of a positive optical power in the order named from the object side;

said zoom lens varying a spacing between principal points of said front lens component and said rear lens component by varying a spacing between said first lens unit and said second lens unit and a spacing between said third lens unit and said fourth lens unit, in order to effect zooming, wherein said second lens unit changes its moving direction during zooming from the wide-angle end to the telephoto end, and wherein while zooming, at least one of said first lens unit and said third lens unit moves.

49. A photographing apparatus comprising:

the zoom lens according to claim 48, and an image pickup element for receiving an image formed by said zoom lens.

* * * * *

UNITED STATES PATENT AND TRADEMARK OFFICE
CERTIFICATE OF CORRECTION

PATENT NO. : 6,633,437 B1
DATED : October 14, 2003
INVENTOR(S) : Koji Hoshi et al.

It is certified that error appears in the above-identified patent and that said Letters Patent is hereby corrected as shown below:

Column 4,
Line 58, "aberration" should read -- aberration diagrams of the zoom lens in Numerical Example 4. --
Line 67, "focal-length" should read -- focal length --.

Column 10,
Lines 35 through 40, the brace for Ra should extend from r11 through r15, inclusive.
Lines 40 through 46, the brace for Rb should extend from r17 through r19, inclusive.
Line 55, "Asperical" should read -- Aspherical --.

Column 11,
Lines 14 through 19, the brace for Ra should extend from r10 through r14, inclusive.
Lines 20 through 23, the brace for Rb should extend from r15 through r16, inclusive.
Line 33, "Asperical" should read -- Aspherical --.
Lines 58 through 63, the brace for Ra should extend from r11 through r15, inclusive.
Lines 64 through 68, the brace for Rb should extend from r17 through r18, inclusive.

Column 13,
Lines 11 and 60, "Asperical" should read -- Aspherical --.
Line 16, "3.911e+01" should read -- 3.9110e-01 --.
Line 47, "$v=$" should read -- $v8=$ --.
Lines 49 through 49, the brace for Rb should extend from r16 through r17, inclusive.
Line 66, "2.528e-07" should read -- 2.5383e-07 --.

Column 15,
Line 7, "Fb" should read -- fFb --.

Signed and Sealed this

Fourth Day of May, 2004

JON W. DUDAS
*Acting Director of the United States Patent and Trademark Office*